(12) United States Patent
Abraham et al.

(10) Patent No.: US 7,757,047 B2
(45) Date of Patent: Jul. 13, 2010

(54) MISSING STORE OPERATION ACCELERATOR

(75) Inventors: Santosh G. Abraham, Pleasanton, CA (US); Lawrence A. Spracklen, Boulder Creek, CA (US); Yuan C. Chou, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 265 days.

(21) Appl. No.: 11/271,056

(22) Filed: Nov. 12, 2005

(65) Prior Publication Data

US 2007/0113022 A1 May 17, 2007

(51) Int. Cl.
*G06F 13/16* (2006.01)
(52) U.S. Cl. .................. 711/144; 711/120; 711/134
(58) Field of Classification Search .............. 711/122, 711/130, 120, 144
See application file for complete search history.

(56) References Cited

U.S. PATENT DOCUMENTS

| 6,553,473 | B1 | 4/2003 | Gaskins et al. |
| 6,912,624 | B2 * | 6/2005 | Barroso et al. ............ 711/141 |
| 2003/0115402 | A1 | 6/2003 | Dahlgren et al. |

FOREIGN PATENT DOCUMENTS

EP         0817063        1/1998

OTHER PUBLICATIONS

Tanenbaum, Andrew S., Structured Computer Organization, 1984, Prentice-Hall, Inc., pp. 10-12.*

Adve, S., et al., "Recent Advances in Memory Consistency Models for Hardware Shared Memory Systems," in *Proceedings of the IEEE*, Special Issue on Distributed Shared Memory, vol. 87, No. 3, pp. 445-455, Mar. 1999.

AMD64 Architecture Programmer's Manual vol. 2: System Programming, Chapter 7.1, *Memory System*, Advanced Micro Devices Pub. No. 24593, Rev. 3.10, pp. 193-200, Feb. 2005.

Barroso, L., et al., "Memory System Characterization of Commercial Workloads," in *Proceedings of the 25th Annual International Symposium on Computer Architecture (ISCA'98)*, pp. 3-14, Apr. 1998, IEEE Computer Society, Jun. 1998, Barcelona, Spain.

(Continued)

*Primary Examiner*—Reginald G Bragdon
*Assistant Examiner*—Kenneth M Lo
(74) *Attorney, Agent, or Firm*—Gregory P. Durbin; Polsinelli Shughart PC (57) ABSTRACT

Maintaining a cache of indications of exclusively-owned coherence state for memory space units (e.g., cache line) allows reduction, if not elimination, of delay from missing store operations. In addition, the indications are maintained without corresponding data of the memory space unit, thus allowing representation of a large memory space with a relatively small missing store operation accelerator. With the missing store operation accelerator, a store operation, which misses in low-latency memory (e.g., L1 or L2 cache), proceeds as if the targeted memory space unit resides in the low-latency memory, if indicated in the missing store operation accelerator. When a store operation misses in low-latency memory and hits in the accelerator, a positive acknowledgement is transmitted to the writing processing unit allowing the store operation to proceed. An entry is allocated for the store operation, the store data is written into the allocated entry, and the target of the store operation is requested from memory. When a copy of the data at the requested memory space unit returns, the rest of the allocated entry is updated.

17 Claims, 7 Drawing Sheets

OTHER PUBLICATIONS

Bhargava, R. and John, L., "Issues in the Design of Store Buffers in Dynamically Scheduled Processors," in *Proceedings of the International Symposium on Performance Analysis of Systems and Software (ISPASS 2000)*, pp. 76-87, Apr. 2000, Austin, Texas.

Book E: Enhanced PowerPC Architecture, Version 1.0, Ch. 6.1.6, IBM Corp., pp. 114-120, May 7, 2002, retrieved from URL: <http://www-306.ibm.com/chips/techlib/techlib.nsf/techdocs/852569B20050FF778525699600682CC7>.

Cantin, J. F. et al., "Improving Multiprocessor Performance with Coarse-Grain Coherence Tracking," in *Proceedings of the 32nd Annual International Symposium on Computer Architecture, International Conference on Computer Architecture (SIGARCH)*, IEEE, pp. 246-257, 2005.

Chong. Y. and Hwang, K., "Performance Analysis of Four Memory Consistency Models for Multithreaded Multiprocessors," *IEEE Transactions on Parallel and Distributed Systems*, IEEE Press, vol. 6, No. 10, pp. 1085-1099, Oct. 1995, Piscataway, New Jersey.

Chou, Y. et al., "Microarchitecture Optimizations for Exploiting Memory-Level Parallelism," in *Proceedings of the 31st Annual International Symposium on Computer Architecture (ISCA '04), ACM SIGARCH Architecture News*, IEEE Computer Society, vol. 32, issue 2, pp. 76-78, Mar. 2004, Munchen, Germany.

Chou, Y. et al., "Store Memory-Level Parallelism Optimizations for Commercial Applications," in *Proceedings of the 38th Annual IEEE/ACM International Symposium on Microarchitecture (MICRO '05), International Symposium on Microarchitecture*, IEEE Computer Society, pp. 183-196, Nov. 14, 2005.

Dubois, M. et al, "Memory Access Buffering in Multiprocessors," in *Proceedings of the 13th International Symposium on Computer Architecture, International Conference on Computer Architecture (SIGARCH)*, IEEE Computer Society Press, pp. 434-442, Jun. 1986, Tokyo, Japan.

Dundas, J. and Mudge, T., "Improving Data Cache Performance by Pre-Executing Instructions Under a Cache Miss," in *Proceedings of the1997 ACM International Conference on Supercomputing (SIGARCH), International Conference on Supercomputing*, ACM Press, pp. 68-75, Jul. 1997, Vienna, Austria.

Gharachorloo, K. et al., "Performance Evaluation of Memory Consistency Models for Shared-Memory Multiprocessors," in *Proceedings of the Fourth International Conference on Architectural Support for Programming Languages and Operating Systems, Architectural Support for Programming Languages and Operating Systems*, ACM Press, pp. 245-257, 1991, Santa Clara, California.

Gharachorloo, K. et al., "Two Techniques to Enhance the Performance of Memory Consistency Models," in *Proceedings of the International Conference on Parallel Processing, Effective Memory Access Methods*, ICPP'91, vol. 1: Architecture/Hardware. pp. 355-364, Aug. 1991,CRC Press, 1991, Austin, Texas.

Goodman, J. et al, "Efficient Synchronization Primitives for Large-Scale Cache-Coherent Multiprocessors," in *Special Issue: Proceedings of ASPLOS-3rd International Conference on Architecture Support for Programming Languages and Operating Systems, ACM SIGARCH Computer Architecture News*, ACM Press, pp. 64-75, Apr. 1989, New York, NY.

Hill, M., "Multiprocessors Should Support Simple Memory Consistency Models," *IEEE Computer, Cybersquare*, IEEE Computer Society Press, vol. 31, issue 8, pp. 28-34, Aug. 1998, Los Alamitos, CA.

Jouppi, N., "Cache Write Policies and Performance," in *Proceedings of the 20th Annual International Symposium on Computer Architecture, International Conference on Computer Architecture*, ACM Press, pp. 191-201, 1993, San Diego, California.

Keeton, K. et al., "Performance Characterization of Quad Pentium Pro SMP Using OLTP Workloads," in *Proceedings of the 25th Annual International Symposium on Computer Architecture, International Conference on Computer Architecture*, IEEE Computer Society, pp. 15-26, Apr. 1998, Barcelona, Spain.

Lamport, L., "How to Make a Multiprocessor Computer that Correctly Executes Multiprocess Programs," IEEE Transactions on Computers, vol. 46, No. 7, pp. 779-782, Jul. 1979.

Maynard, A., et al., "Contrasting Characteristics and Cache Performance of Technical and Multi-User Commercial Workloads," in *Proceedings of the Sixth International Conference on Architectural Support for Programming Languages and Operating Systems, Architectural Support for Programming Languages and Operating Systems*, ACM Press, pp. 145-156, Oct. 1994, San Jose, CA.

Moshovos, A., "RegionScout: Exploiting Coarse Grain Sharing in Snoop-Based Coherence," in *Proceedings of the 32nd Annual International Symposium on Computer Architecture (ISCA '05), ACM SIGARCH Computer Architecture News*, vol. 33, issue 2, ACM Press, pp. 234-245, May 2005.

Mounes-Toussi, F. and Lilja, D., "Write Buffer Design for Cache-Coherent Shared-Memory Multiprocessors," in *Proceedings of the 1995 International Conference on Computer Design: VLSI in Computers and Processors (ICCD'95)*, IEEE Computer Society, pp. 506-511, Oct. 2-4, 1995.

Pai, V. et al., "An Evaluation of Memory Consistency Models for Shared-Memory Systems with ILP Processors," in *Proceedings of the Seventh International Conference on Architectural Support for Programming Languages and Operating Systems*, ACM Press, pp. 12-23, Oct. 1996, Cambridge, MA.

Park, I., et al., "Reducing Design Complexity of the Load/Store Queue," in *Proceedings of the 36th Annual IEEE/ACM International Symposium on Microarchitecture*, IEEE Computer Society, pp. 411, Dec. 2003.

Ranganathan, P., et al., "Performance of Database Workloads on Shared-Memory Systems with Out-of-Order Processors," in *Proceedings of the Eighth International Conference on Architectural Support for Programming Languages and Operating Systems ASPLOS-VIII*, ACM Press, pp. 307-318, Oct. 1998.

Ranganathan, P., et al., "Using Speculative Retirement and Larger Instruction Windows to Narrow the Performance Gap between Memory Consistency Models," in *Proceedings of the Ninth Annual ACM Symposium on Parallel Algorithms and Architectures (SPAA '97), ACM Symposium on Parallel Algorithms and Architectures*, ACM Press, pp. 199-210, Jun. 1997, Newport, Rhode Island.

Sahuquillo, J. and Pont, A., "Impact of Reducing Miss Write Latencies in Multiprocessors with Two Level Cache," in *Proceedings of the 24th Conference on EUROMICRO*, vol. 1, IEEE Computer Society, pp. 333-336, Aug. 1998.

Skadron, K. And Clark, D., "Design Issues and Tradeoffs for Write Buffers," in *Proceedings of the Third IEEE Symposium on High-Performance Computer Architecture (HPCA '97)*, IEEE Computer Society, pp. 144-155, Feb. 1997.

Sorin, D., et al, "Analytic Evaluation of Shared-Memory Systems with ILP Processors," in *Proceedings of the 25th Annual International Symposium on Computer Architecture (ISCA '98), ACM SIGARCH Computer Architecture News*, vol. 26, issue 3, pp. 380-391 Apr. 1998, Barcelona Spain.

Stenstrom, P. et al., "Boosting the Performance of Shared Memory Multiprocessors," in *IEEE Computer*, IEEE Computer Society Press, vol. 30, issue 7, pp. 63-70, Jul. 1997.

Tsuei, T. and Yamamoto, W., "Queuing Simulation Model for Multiprocessor Systems," *IEEE Computer*, IEEE Computer Society Press, vol. 36, issue 2, pp. 58-64, Feb. 2003.

European Search Report, Application No. 06255771.5, 9 pages, Dec. 20, 2007.

* cited by examiner

MISSING STORE OPERATION ACCELERATOR

BACKGROUND

1. Field of the Invention

The invention relates to the field of computer architecture. More specifically, the invention relates to accelerating store operations in a shared memory multiprocessor system.

2. Description of the Related Art

Commercial application such as online transaction processing (OLTP), web servers and application servers represent a crucial market segment for shared-memory multiprocessor servers. Numerous studies have shown that many of these applications are characterized by large instruction and data footprints which cause high cache miss rates that result in high Cycles Per Instruction (CPI). While there has been substantial research to improve their instruction miss rates as well as to mitigate the performance impact of their high load miss rates, there has been little research into the performance impact of stores in commercial applications. Stores constitute a very significant percentage of the dynamic instruction count of commercial applications and store miss rates are comparable to, if not higher than, load miss rates and instruction miss rates.

Off-chip store misses (i.e., instruction and data accesses that miss the on-chip caches) require long latency accesses to either main memory or an off-chip cache and are particularly expensive. The performance impact of off-chip store misses depends on the degree of their overlap with computation and with other off-chip misses.

The majority of off-chip store misses cannot be overlapped with computation. Store handling optimizations that improve the number of overlapping store misses handled in parallel (hereinafter referred to as store memory-level parallelism), such as store prefetching, have been illustrated to be critical in mitigating the performance impact of these misses. While store prefetching is demonstrated to be effective, it consumes substantial L2 cache bandwidth, which will be a precious resource in future aggressive chip multi-processors. Hence, even with store prefetching, the performance impact of off-chip store misses is not fully mitigated Another technique to mitigate the performance impact of store misses is to increase size of the store queue and the store buffer. When the store queue is full, the processor must stop retirement as soon as the next instruction to retire is a store. At that point, the reorder buffer as well as the store buffer can no longer drain, so they begin to fill up. When the reorder buffer is full or when the processor tries to dispatch a store and the store buffer is full, the processor can no longer dispatch any more instructions. Eventually, the processor pipeline is stalled and remains so until the store queue drains. Thus, a missing store at the head of the store queue can stall the processor for several hundred cycles. However, there are limits to increasing the store buffer and store queue sizes. If an intra-processor data dependence exists between an uncommitted store and a subsequent load, the memory contains a stale value. The processor must detect this dependence and either deliver the value from the store buffer/queue or stall the load until the value is committed. Thus, every load must associatively search the store buffer/queue and ascertain that there are no prior stores with matching addresses. In order to detect store-load dependences, the store buffer/queue are traditionally implemented using a Content Addressable Memory (CAM) structure. The CAM nature of these two structures place a limit on how much they can be enlarged before they impact the processor's clock frequency target.

The performance of stores is also impacted by the memory consistency model implemented by the processor. Previous detailed studies on memory consistency models were performed using scientific workloads rather than commercial workloads and most were focused on the performance differences between sequential consistency and release consistency. However, none of the four remaining server processor instruction set architectures implement the sequential consistency model. They either implement variations of processor consistency (INTEL/AMD X86 and X64, SUN SPARC TSO), weak consistency (IBM POWERPC, SUN SPARC RMO) or release consistency (INTEL IA-64). These memory consistency models place ordering constraints that greatly affect the impact of stores misses. In particular, the processor consistency models used by highest-volume server processors require an in-order commit of stores. A straightforward implementation that satisfies this requirement holds up all later stores while a store miss is handled.

In addition to the challenges of increasing CAM implemented store buffers/queues, increasing store buffer and store queue sizes is less effective in improving memory-level parallelism than previously assumed, especially in commercial application and with commercial workloads. Serializing instructions (e.g., casa and membar in the SPARC ISA) remain as major impediments. Most of these serializing instructions occur in the lock acquire and lock release of critical sections. On encountering a serializing instruction, the store buffer/queue has to be drained of all prior store misses in the processor consistency model. While increasing store buffer/queue sizes may be effective in alleviating the impact of bursty stores and store misses, it does not address the impact of store misses followed by serializing instructions.

Effective mechanisms to mitigate the large performance impact of store misses in current processor architectures and systems that do not use excessive bandwidth for hardware store prefetching or do not implement very large store buffers/queues that impose cycle time constraints is desirable.

SUMMARY

It has been discovered that delay from missing store operations can at least be reduced, if not eliminated, with a missing store operation accelerator. A missing store operation accelerator indicates exclusively owned memory space units (e.g., cache blocks or cache lines) without corresponding data. Although a memory space unit may have been evicted from a low-latency memory, the effective coherence state can correctly be represented as exclusively-owned. For example, with reference to the MESI protocol, the memory space units are still in 'E' state, although no longer represented in the low-latency memory. As long as this exclusive ownership coherence state is valid for a memory space unit (i.e., no coherence state changing event has occurred since the memory space unit resided in the low-latency memory in 'E' state), then maintaining indication of the memory space unit in a missing store operation accelerator allows the system to behave as if it still resides in the low-latency memory without occupying an entry in the low-latency memory and without the corresponding data. In particular, a store that misses in low-latency memory and hits in the missing store operation accelerator may correctly be allowed to commit, thus accelerating the commit of later store operations. A hit in the missing store operation accelerator causes allocation of an entry in the low-latency memory for a memory space unit. The store data is retained in the allocated entry, and the system is queried for the data of the memory-space unit. Ultimately, this data is merged with the store data in the allocated low-latency memory entry.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF EMBODIMENT(S)

The description that follows includes exemplary systems, methods, techniques, instruction sequences and computer program products that embody techniques of the present invention. However, it is understood that the described invention may be practiced without these specific details. For instance, reference is made to the MESI protocol, although embodiments may also implement MOESI, Dragon, enhanced MESI, etc. In other instances, well-known protocols, structures and techniques have not been shown in detail in order not to obscure the invention.

The following description utilizes various terms including memory space units, point of coherence, exclusively-owned memory coherence state, and chip. A memory space unit generically describes a unit of a space in a memory. With respect to cache, a cache line or a cache block may be a memory space unit of a given size (e.g., 64-bytes, 32-bytes, etc.). A point of coherence is a level in a memory hierarchy where data is globally visible and complies with a particular coherence protocol. For example, a point of coherence may be L2 cache. Exclusively-owned memory coherence state comports with the 'E' state in MESI and MOESI. However, it is not limited to these protocols. The exclusively-owned memory state represents a coherence state that indicates exclusive ownership of a memory space unit, also analogous to Valid-Exclusive in the Dragon coherence protocol. The term chip corresponds to a piece of silicon and is not limited to a single processor or central processing unit.

As described previously, a store operation incurs an invalidation penalty when missing in a low-latency memory. In a system that enforces in-order commit, a store operation that cannot be written to a point of coherency blocks other store operations from retiring. Not only are store operations prevented from being committed, but the delay may stall the pipeline if the store queue fills and prevents store operations from retiring. This delay can be avoided when the memory space unit has been evicted from a low-latency memory due to space constraints and no coherence state changing event has occurred for the memory space unit. Although a copy of the data at the target is not in any other low-latency memory with a valid coherence state, absence of a representation of the target from the low-latency memory forces the low-latency memory to delay the store operation at least until the target is retrieved from memory. Retaining some indication of those memory space units that are exclusively-owned, yet absent from low-latency memory, at least reduces, if not eliminates, this unnecessary delay from the coherence state transaction overhead.

Figure 1:
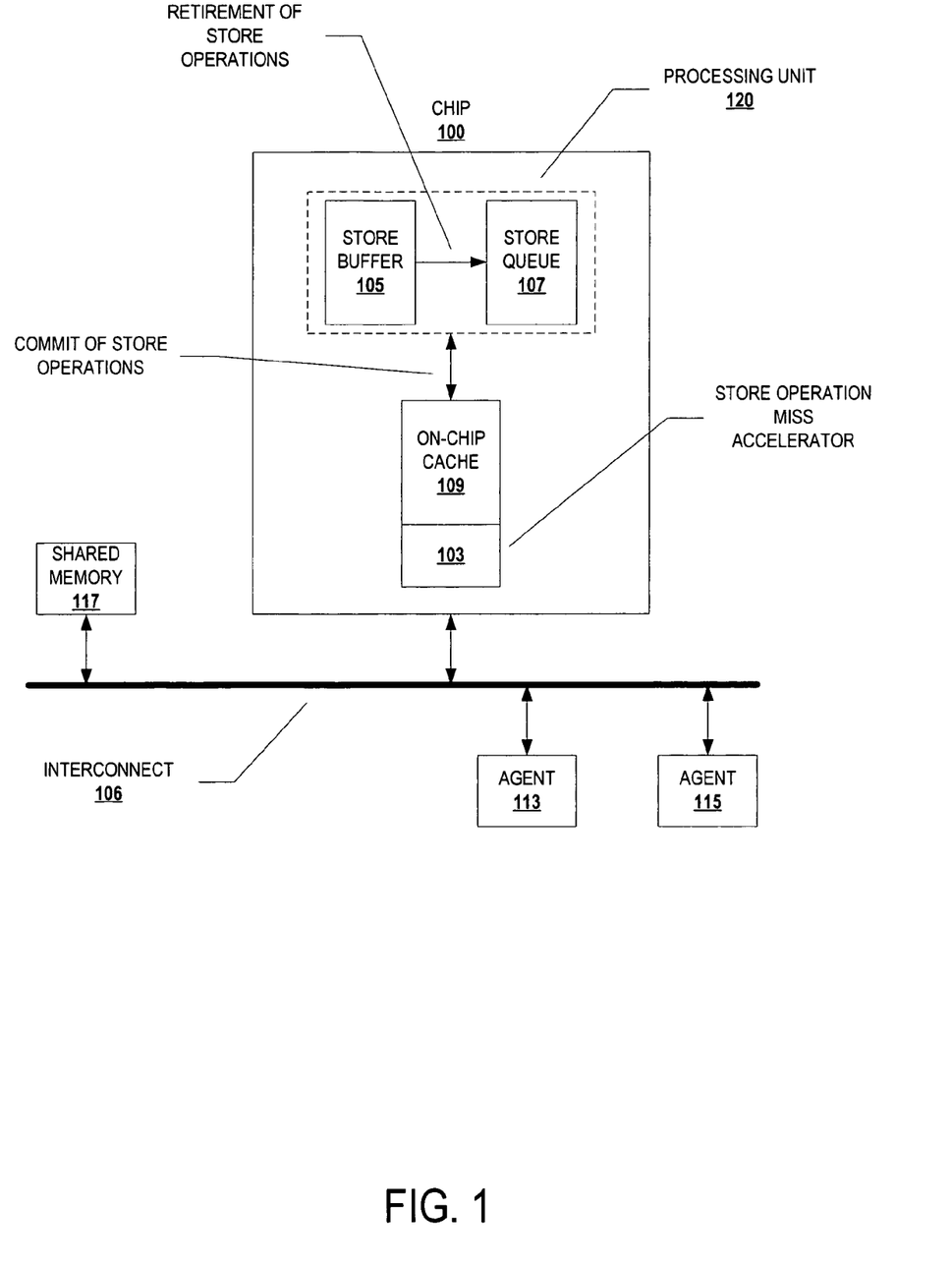
FIG. 1 depicts an example chip with a missing store operation accelerator.

FIG. 1 depicts an example chip with a missing store operation accelerator. A chip 100 is coupled with an interconnect 106 (e.g., bus). An agent 113 and an agent 115, which represent at least one of another chip, processing unit, memory controller, etc., and a shared memory 117 are also coupled to the interconnect 106. The shared memory 117 is shared amongst the chip 100 and the agents 113 and 115. The chip 100 includes a processing unit 120. The processing unit 120 includes a store buffer 105 and a store queue 107. Assuming the chip 100 resides in a system that enforces a memory model that requires store operations to be globally visible in program order (e.g., processor consistency, total store order, etc.), then the chip 100 enforces in-order commit of store operations into a point of coherency, such as on-chip cache 109. The store operations are held in the store buffer 105 and the store queue 107. A store operation is allocated an entry in the store buffer 105 when it is renamed and dispatched. The execution of the store operation may be viewed as two distinct operations: the address generation operation, which calculates and enters an address into the store buffer 105; and the data operation, which enters the store data into the store buffer 105. When both store address and data operations are complete, and all earlier instructions have retired, the store is retired. At this point, the store address and data are moved into the store queue 107. A store is committed when the store value is written into the on-chip cache 109 and becomes globally visible to all other processing units in the system (e.g., other cores on the same chip 100, agents 113 and 115, etc.). Thus, a store operation is held in the store buffer 105 between rename and retirement and held in the store queue 107 between retirement and commit. This example description of handling store operations is intended to aid in understanding the described embodiments and not meant to be limiting. Those of ordinary skill in the art should appreciate that different chip implementations may handle store operations prior to being written into a point of coherence differently.

The chip 100 also includes a missing store operation accelerator 103. Although the missing store operation accelerator 103 is depicted as residing on the chip, it may reside off-chip with L3 cache, for example. The missing store operation accelerator 103 indicates memory space units that are still effectively exclusively-owned by the on-chip cache 109, even though some or all of the memory space units may have been evicted (or will be evicted) from the on-chip cache 109. Until a coherence state changing event occurs for such an exclusively-owned memory space unit, the memory space unit will be indicated in the missing store operation accelerator 103, unless replaced due to space constraints. As long as the memory space unit is indicated in the missing store operation accelerator 103, then store operations by the processing unit 120 can proceed despite missing in the on-chip cache 109.

Replacement, installation and eviction/invalidation of entries from the missing store operation accelerator 103 can vary among different realizations and embodiments. For instance, entries can be installed incident to eviction of an exclusively-owned memory space unit from the on-chip cache 109, or incident to a coherence state change to exclusively-owned while still present in the on-chip cache 109. If installation is incident to coherence state change, then the memory space unit will already be indicated in the missing store operation accelerator 103 when evicted from the on-chip cache 109. Generally, a coherence state changing event will force eviction/invalidation of an entry in the missing store operation accelerator 103. The following table 1 indicates example effects of store requests and snoops (e.g., request to own, request to share, etc.) on an entry in a missing store operation accelerator.

TABLE 1

Operation of Missing store operation accelerator

| | Hit | Miss |
|---|---|---|
| Store Request | positive ACK (or send retry notification), invalidate target of store request | negative ACK |
| Snoop | invalidate target of snoop | no change |

With regard to replacement, replacement of entries may be implemented in accordance with a least recently used (LRU) technique. However, implementation may alternatively or additionally employ a prediction mechanism to implement replacement.

Figure 2:
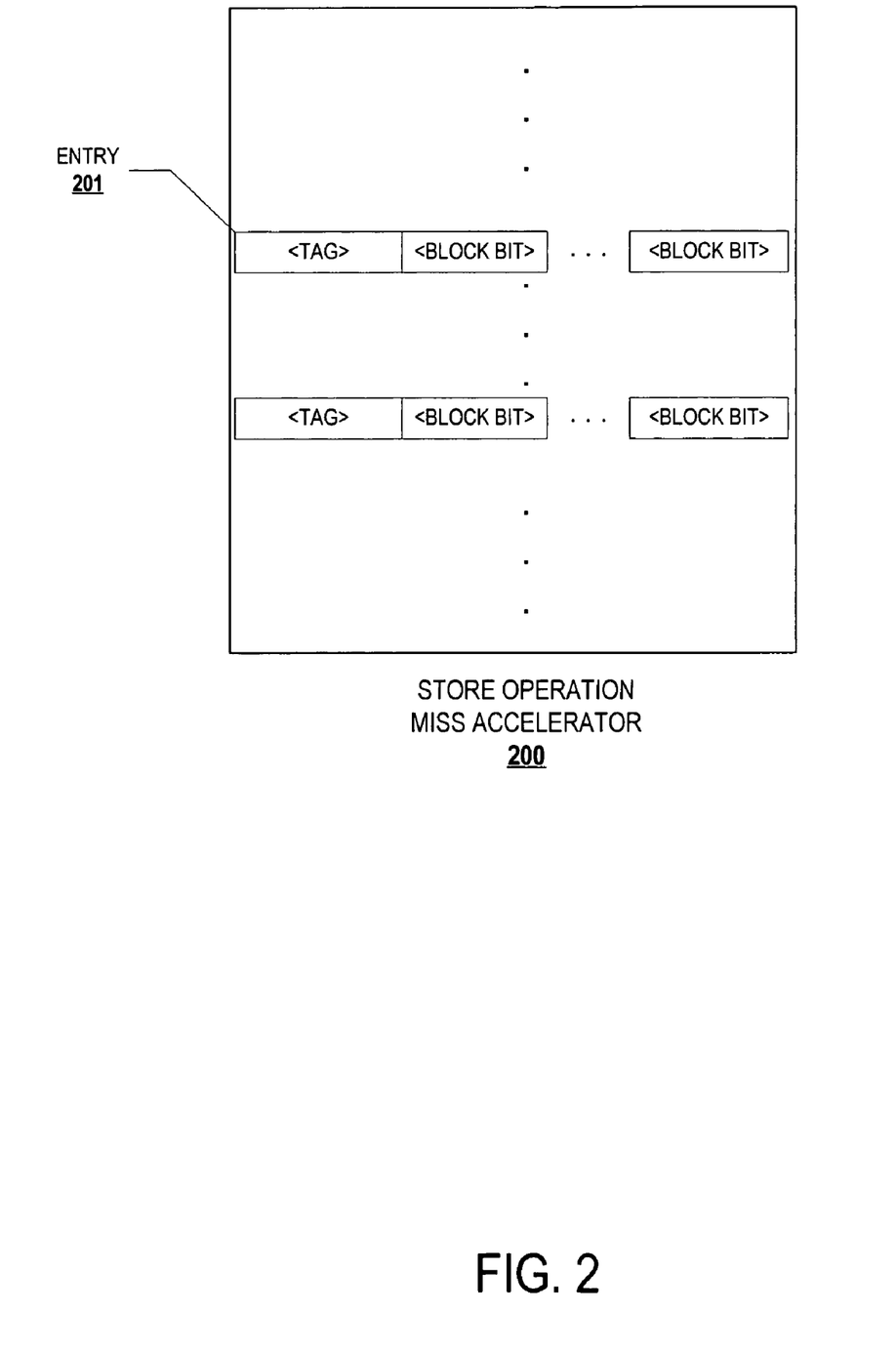
FIG. 2 depicts an example missing store operation accelerator.

FIG. 2 depicts an example missing store operation accelerator. A missing store operation accelerator 200 includes a plurality of entries. An entry 201 is depicted in FIG. 2. The entry 201 includes a tag field and a series of block bits. The address of a store operation is compared against the tag of one or more entries. Obviously, look-up in the accelerator is dependent upon whether the missing store operation accelerator 200 is implemented as direct-mapped cache, set-associative cache, fully associative cache, etc. When the entry is found with a matching tag, then a subset of the store address is used to select a block bit in the entry. The block bit will indicate whether the target of the store operation as indicated by the store address remains in an exclusively-owned state for the corresponding cache or processing unit. For example, assume the missing store operation accelerator 200 is implemented to hold 8 k tags (i.e., 8192 entries). Assuming 43-bit physical addresses, 32-bit address tags, and 64-bit entries, then the missing store operation accelerator 200 has 32 bits remaining to represent memory space units. Hence, each 32-bit tag can represent 32 memory space units. With 8 k entries, if a memory space unit is 64 bytes, then a 64 kilobyte missing store operation accelerator can represent 16 megabytes of memory space. With a 43-bit physical address, the most significant 32 bits are used to locate an entry. The next 5 most significant bits are used to select a bit that represents one of 32 64-byte cache lines/sub-blocks. Again, this specific implementation has been described to aid in understanding and not meant to be limiting. Another embodiment may choose to represent a smaller memory space and allocate an entry in the missing store operation accelerator per physical address instead of using tags. Obviously implementation of a missing store operation accelerator will vary with the granularity of memory space units.

Figure 3:
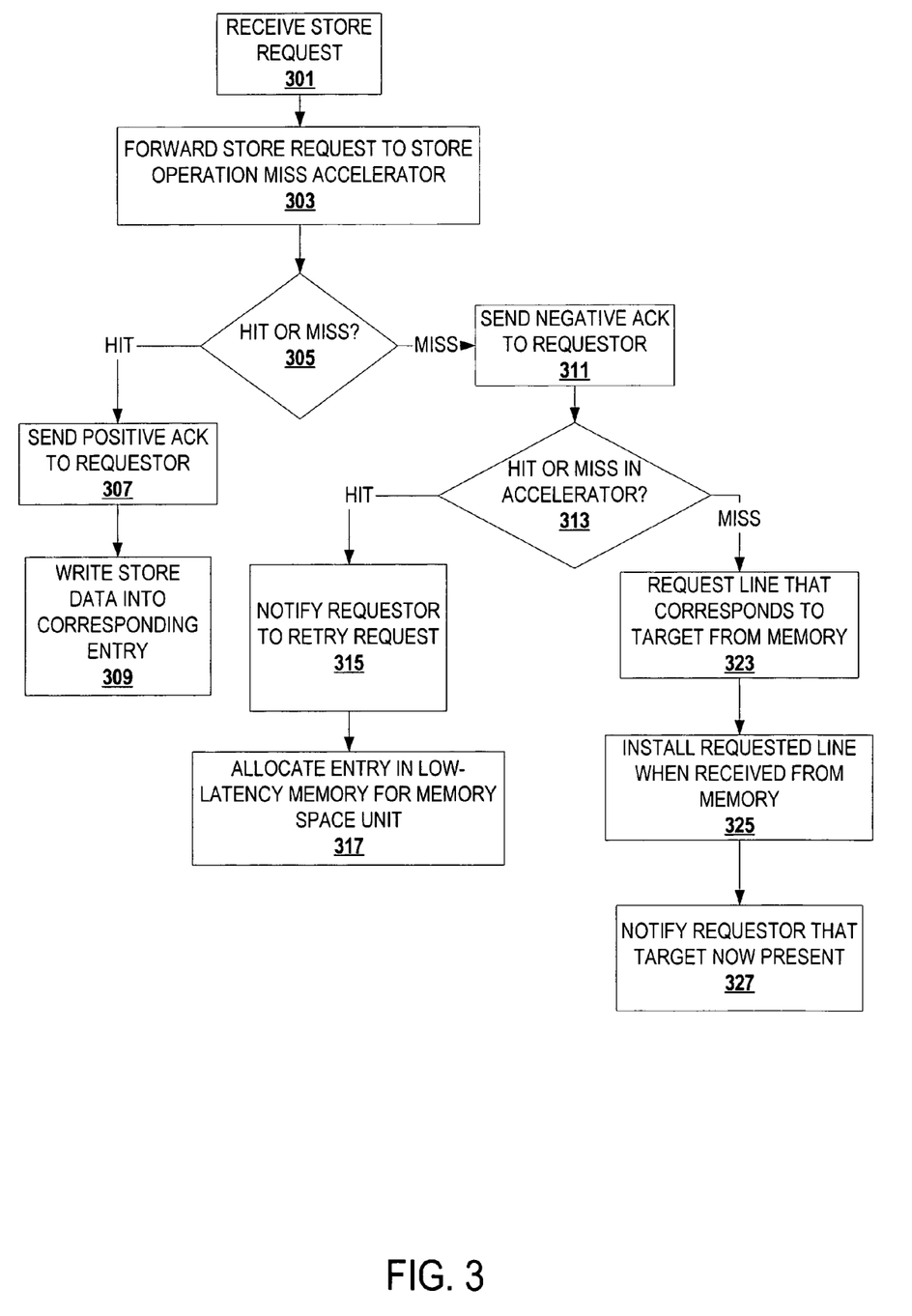
FIG. 3 depicts an example flowchart for handling of a store request by a low-latency memory in conjunction with a missing store operation accelerator.

FIG. 3 depicts an example flowchart for handling of a store request by a low-latency memory in conjunction with a missing store operation accelerator. At block 301 a store request is received. At block 303, the store request is forwarded to a missing store operation accelerator. At block 305, it is determined whether the store request hits or misses in the low-latency memory. If the request misses, then control flows to block 311. If the request hits, then control flows to block 307.

At block 307, a positive acknowledgement is sent from the low-latency memory to the requestor. At block 309, the store data is written into a corresponding entry of the low-latency memory.

At block 311, a negative acknowledgement is sent to the requestor. At block 313, it is determined if the store request hits or misses in the missing store operation accelerator. If the store request hits, then control flows to block 315. If the store request misses, then control flows to block 323. Although serial operation is described, a missing store operation accelerator and a corresponding low-latency memory may operate in parallel. For instance, a negative acknowledgement is not sent unless the store request misses in both the accelerator and the low-latency memory. A positive acknowledgement from the accelerator is sent to a requestor instead of a negative acknowledgement from the low-latency memory.

At block 315, the requestor is notified to retry the store request. At block 317, an entry is allocated in the low-latency memory for the memory space unit targeted by the store request. When the requestor retries, the store request hits in the low-latency memory and control will arrive at block 307.

At block 323, the line that is targeted by the store request is requested from memory. At block 325, when the line is received from memory, the received line is installed. At block 327, the requestor is notified that the targeted line is now present.

It should be understood that the control flow depicted in FIG. 3 is an example. Operations may be performed differently (e.g., different order, in parallel, etc.). For example, instead of notifying the requestor to retry at block 315, a positive acknowledgement is sent to the requestor. Although a negative acknowledgement has already been sent, a system may allow for a subsequent acknowledgement to be sent within a particular window of time. If a positive acknowledgement is sent, then an entry is allocated in the low-latency memory for the memory space unit and the store data is written to the allocated entry. In addition, a copy of data at the memory space unit is requested from the memory space. Ultimately, the data retrieved from the memory space at the memory space unit is merged with the allocated entry in the low-latency memory. As already stated, interaction of the accelerator with the cache may also vary depending on implementation. For instance, instead of the missing store operation accelerator interacting with an L2 cache point of coherency, the missing store operation accelerator may interact with an L3 cache.

Figure 4:
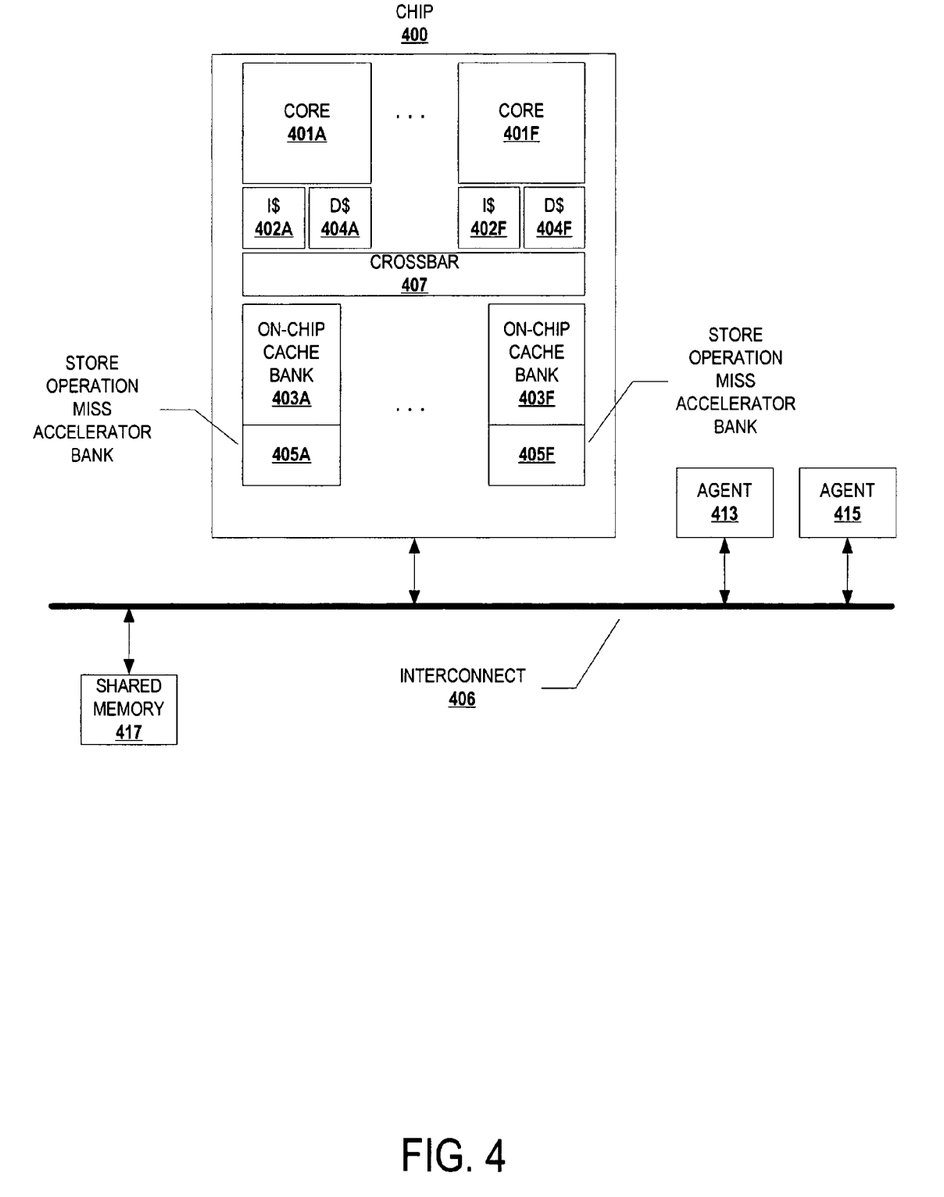
FIG. 4 depicts an example chip with missing store operation accelerator banks.

FIG. 4 depicts an example chip with missing store operation accelerator banks. If on-chip cache is banked, then the missing store operation accelerator may also be banked, proportionately, less aggressively, etc. In FIG. 4, a chip 400 includes cores 401A-401F, instruction cache 402A-402F, and data cache 404A-404F. A crossbar 407 connects the cores together and connects the cores to on-chip cache banks 403A-403F. Each of the on-chip cache banks 403A-403F has corresponding ones of the missing store operation accelerator banks 405A-405F. The chip 400 is coupled with an interconnect 406, which is also coupled with agents 413 and 415 and a shared memory 417. Banking the missing store operation accelerator enables the individual missing store operation accelerator banks to be co-located with their corresponding on-chip cache bank. Co-location enables the missing store operation accelerator and the on-chip cache to be queried in parallel and their responses to be combined into a single response to the requester in a timely manner. Furthermore, the aggregate bandwidth of the missing store operation accelerator is enhanced through banking to a degree/manner similar to the on-chip caches.

Figure 5:
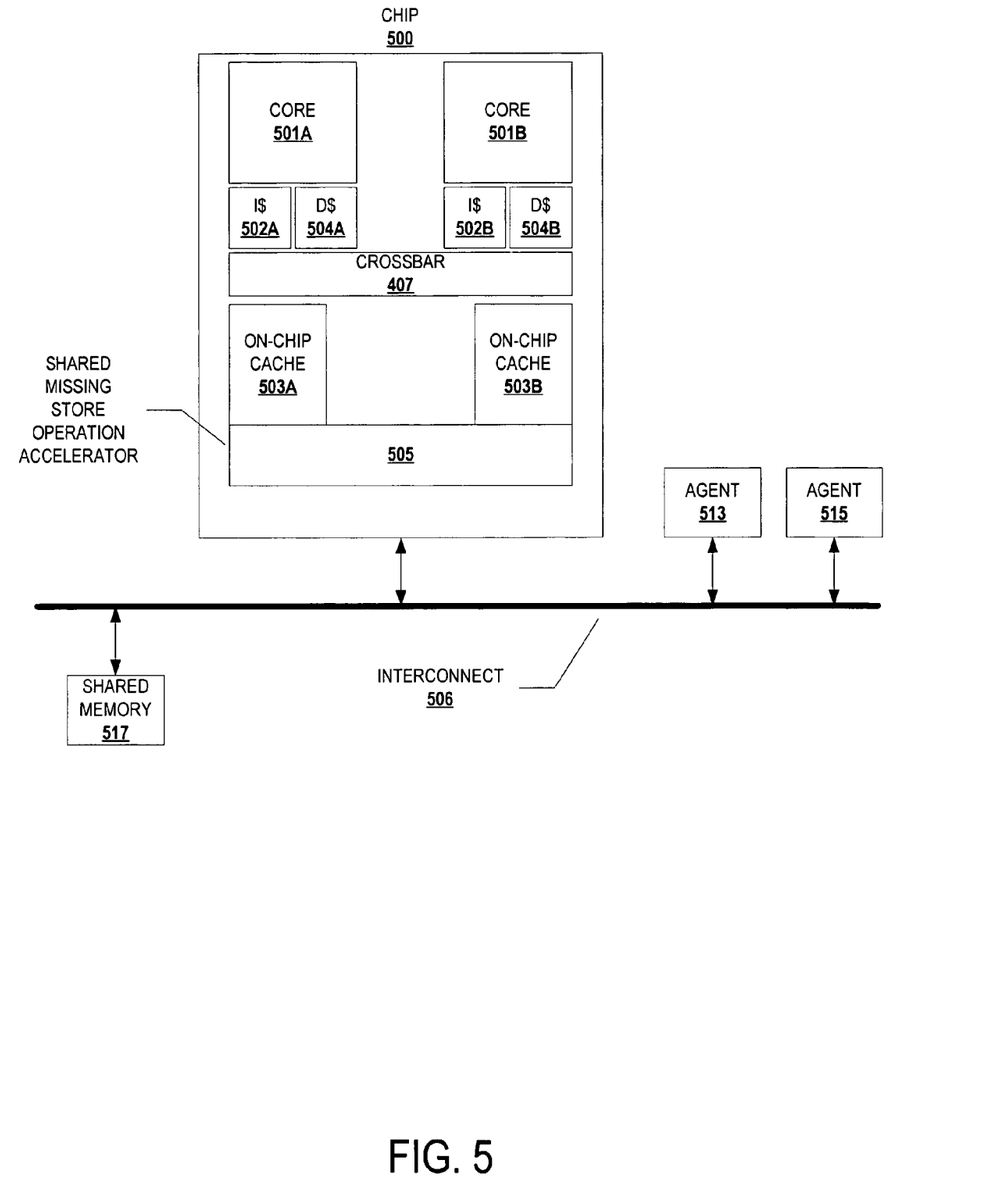
FIG. 5 depicts an example chip with a shared missing store operation accelerator for separate low-latency memories.

FIG. 5 depicts an example chip with a shared missing store operation accelerator for separate low-latency memories. FIG. 5 depicts a multi-core (i.e., multiple processing units) chip 500 with a separate cache for each core. The chip 500 is depicted as being coupled with an interconnect 506, which connects the chip 500 to agents 513 and 515 and a shared memory 517. The chip 500 includes cores 501A and 501B, instruction cache 502A and 502B, data cache 504A and 504B, and on-chip cache 503A and 503B. Although the cores 501A and 501B reside on the same chip 500, they do not share cache. The core 501A utilizes the on-chip cache 503A and the core 501B utilizes the on-chip cache 503B. Instead of a separate missing store operation accelerator for each cache, FIG. 5 depicts a shared missing store operation accelerator 505. The shared missing store operation accelerator 505 indicates exclusively-owned memory space units for both on-chip caches 503A and 503B. Since the accelerator 505 indicates memory space units for multiple caches, then additional bits are utilized to indicate which cache owns a memory space unit, if any (i.e., instead of a single bit conveying exclusively-owned or non-exclusively owned, multiple bits are used to indicate which of multiple caches own a memory space unit in an exclusively-owned coherence state). Since the shared missing store operation accelerator 505 includes information for multiple caches, additional functionality and information may be added to the accelerator. Adding a data path through the shared accelerator 505 allows fast path functionality to be moved closer to the cores, hence increasing speed of the fast path. For instance, instead of a Northbridge chip(s) reflecting snoops, the shared accelerator can handle certain snoops. With the additional bits indicating ownership, the shared accelerator 505 can indicate which of the cores owns a memory space unit, if any, and if the shared accelerator 505 owns the memory space unit. The shared accelerator 505 takes ownership of a memory space unit when a store request from one of the cores 501A and 501B hits in the shared accelerator 505. The indication of ownership by the shared accelerator conveys that the memory space unit is not in an exclusively-owned state, but the memory space unit is owned by one of the local cores 501A and 501B (the memory space unit may even be shared by multiple cores and exclusively owned by the shared accelerator). Assume that on-chip cache 503A held a representation of a memory space unit <A> in an 'E' state. The representation is evicted from the on-chip cache 503A, and now indicated in the shared accelerator 505 as owned by the on-chip cache 503A. The core 501A attempts to write to <A>, which misses in the on-chip cache 503A and hits in the shared accelerator 505. Since the store request hits in the shared accelerator 505, the indication for <A> is changed to indicate ownership by the shared accelerator 505. If the core 501B attempts to write to <A>, the store request misses in the on-chip cache 503B and hits in the shared accelerator 505. The hit in the shared accelerator 505 with indication of ownership by the shared accelerator 505 causes the shared accelerator 505 to snoop the on-chip cache 503A. Since the on-chip cache 503A resides on the same chip 500, the reply to the snoop will be available substantially faster than when waiting for a reply from either of agents 513 and 515. In addition, traffic placed on the interconnect 506 is reduced because a snoop is not transmitted over the interconnect 506. Of course, the missing store operation accelerator 505 can also snoop a cache if a target of a store request hits in the accelerator with a different owner than the requestor. In another example, when a memory space unit is evicted from one of the on-chip caches, the memory space unit is indicated in the shared accelerator 505 as being exclusively-owned by the shared accelerator. When <A> is evicted from the on-chip cache 503A, it is indicated in the shared accelerator 505 as being owned by the shared accelerator 505 instead of the on-chip cache 503A. So, in response to a store request by the core 501B, the shared accelerator 505 can give exclusive ownership to the on-chip cache 503B without querying the on-chip cache 503A and update ownership indication to reflect on-chip cache 503B as the exclusive owner. If the on-chip cache 503A subsequently requests the memory space unit, the shared accelerator 505 has indication that the on-chip cache 503B has exclusive ownership. The shared accelerator 505 can then cause invalidation of the memory space unit in the on-chip cache 503B and hand exclusive ownership to the on-chip cache 503A.

Figure 6:
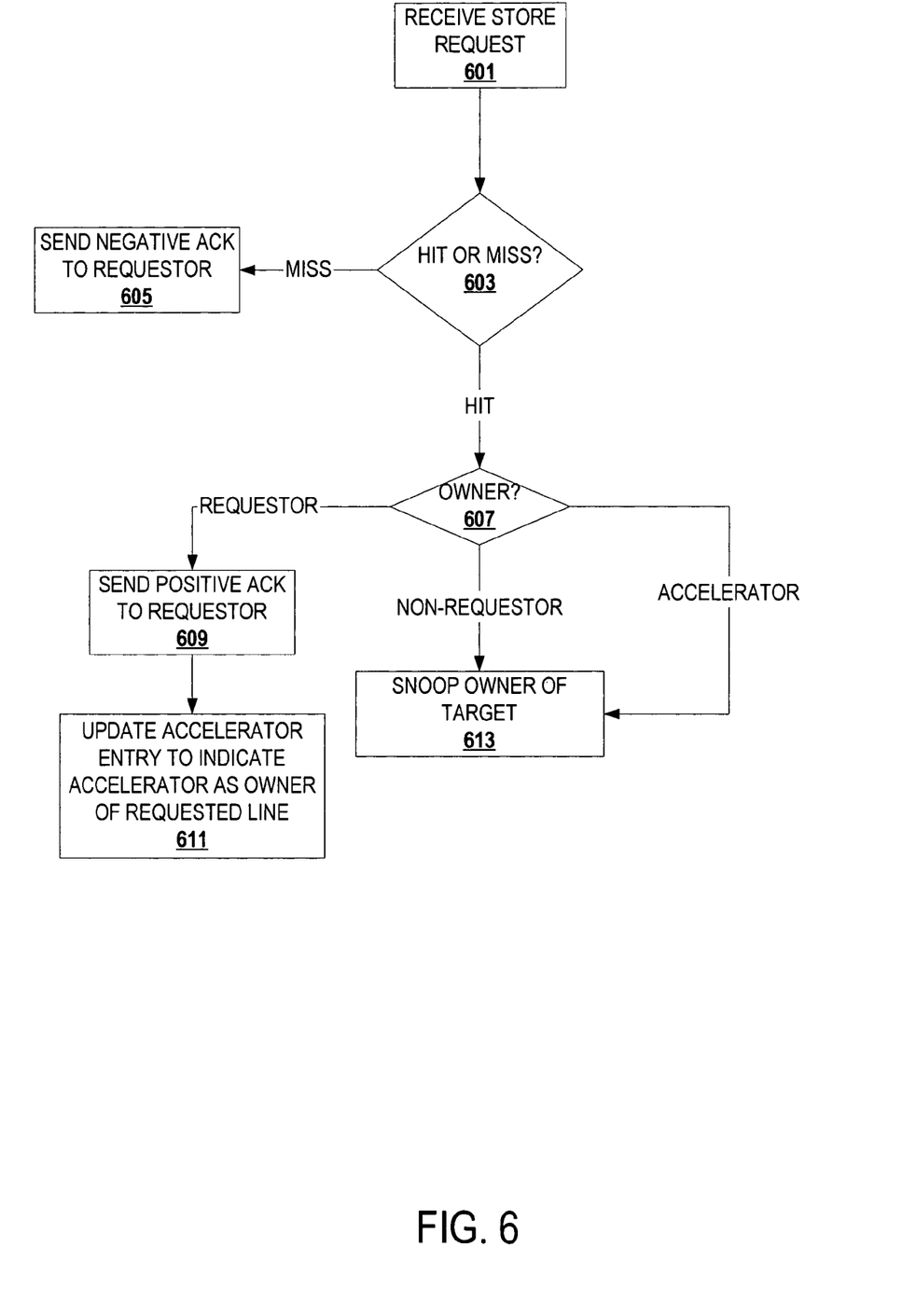
FIG. 6 depicts an example flowchart for a shared missing store operation accelerator to handle requests.

FIG. 6 depicts an example flowchart for a shared missing store operation accelerator to handle requests. At block 601, a store request is received. At block 603, it is determined whether the store request hits or misses in the accelerator. If the store request misses, then control flows to block 605. If the store request hits, then control flows to block 607.

At block 605, a negative acknowledgement is sent to the requester.

At block 607, the owner of the target of the store request is determined. If the owner if the requestor, then control flows to block 609. If the owner is not the requester and/or is the accelerator, then control flows to block 613.

At block 609, a positive acknowledgement is sent to the requestor. As stated above with respect to FIG. 3, a notification for the requestor to retry can be sent instead of a positive acknowledgement, which most likely has been preceded by a negative acknowledgement. At block 611, the accelerator entry is updated to indicate the accelerator as the owner of the target.

At block 613, the owner of the store request target is snooped.

The described embodiments may be provided as a computer program product, or software, possibly encoded in a machine-readable medium as instructions used to program a computer system (or other electronic devices) to perform a process. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Figure 7:
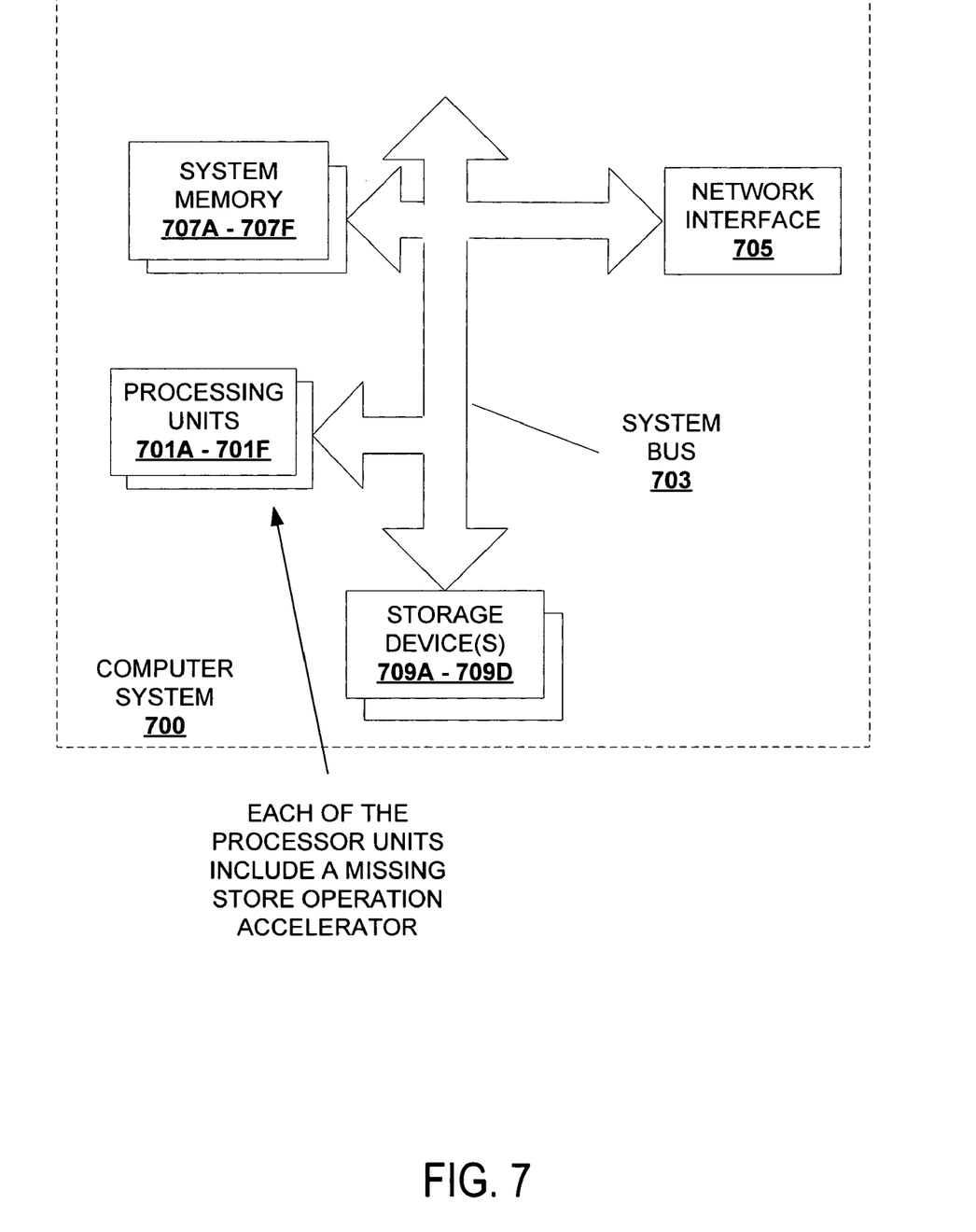
FIG. 7 depicts an example computer system.

FIG. 7 depicts an example computer system. A computer system 700 includes processing units 701A-701F. The computer system 700 also includes a system memory 707A-707F, at least some of which is shared among multiple ones of the processing units 701A-701F. The system memory may include one or more of cache, SRAM, DRAM, RDRAM, EDO RAM, DDR RAM, EEPROM, etc.). The computer system 700 further includes a system bus 703 (e.g., LDT, PCI, ISA, etc.), a network interface 705 (e.g., an ATM interface, an Ethernet interface, a Frame Relay interface, etc.), and a storage device(s) 709A-709D (e.g., optical storage, magnetic storage, etc.). Realizations may include fewer or additional components not illustrated in FIG. 7 (e.g., video cards, audio cards, additional network interfaces, peripheral devices, etc.). At least one of the processing units 701A-701F include a missing store operation accelerator or a shared missing store operation accelerator.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method comprising:
    providing at least one bit in a first cache memory to indicate that a memory space unit associated with a second cache memory is an exclusively owned memory space unit;
    setting the at least one bit in the first cache memory to indicate that the memory space unit is exclusively owned by the second cache memory; and
    allowing a store operation that misses a target memory space unit in the second cache memory to commit, upon resubmission of the store operation, despite missing the target memory space unit in the second cache memory when the store operation was originally submitted if the target memory space unit of the store operation is the indicated exclusively-owned memory space unit; and
    wherein the indicated exclusively-owned memory space unit is indicated as such when there is not a copy of data of the target memory space unit in the second cache memory;
    wherein allowing the missing store operation to proceed comprises:
        installing an entry in the second cache memory with data of the store operation for the memory space unit;
        requesting a copy of data located at the exclusively-owned memory space unit from a memory space;
        retrieving the data from the memory space; and
        updating the installed entry with the copy of the data modified by the store operation data of the store operation.

2. The method of claim 1, wherein the memory space unit comprises a cache line or a cache block.

3. The method of claim 1, wherein the indicating of the exclusively owned memory space unit is incident to one of eviction of a representation of the exclusively owned memory space unit from the second cache memory, installation of a representation of the exclusively owned memory space unit and indication of exclusively owned memory coherence state, and updating of a memory coherency state for the exclusively owned memory space unit to exclusively owned.

4. The method of claim 1 further comprising indicating whether the first cache memory, the second cache memory, or a third cache memory owns a memory space unit indicated in the first cache memory, wherein the at least one bit comprises a plurality of bits.

5. The method of claim 4 further comprising snooping the second cache memory responsive to a store operation missing in the third cache memory and hitting in the first cache memory if a target of the store operation missing in the third cache memory is indicated in the first cache memory but not indicated as owned by the third cache memory.

6. The method of claim 1 further comprising altering the at least one bit in the first cache memory to indicate that the memory space unit is not exclusively owned if a snoop for the memory space unit hits in the first cache memory.

7. A machine-readable storage medium containing machine-executable instructions which, when executed, perform the method of claim 1.

8. An apparatus comprising:
    a processing unit;
    an L1 cache memory coupled with the processing unit, the L1 cache memory operable to represent memory space units and to indicate a coherence state of the memory space units;
    a missing store operation accelerator cache operable to:
        indicate, with a plurality of bits located in the missing store operation accelerator, exclusively owned memory space units associated with the L1 cache memory;
        set at least one of the plurality of bits to indicate that at least one of the exclusively owned memory space units is exclusively owned by the L1 cache memory; and
        indicate whether a store operation misses or hits in the missing store operation accelerator cache;
    the missing store operation accelerator cache further configured to:
        receive a store operation request that misses in the L1 cache memory; and
        notify a requestor to retry the store operation request to the L1 cache memory;
        allow the missing store request to proceed comprising:
            installing an entry in the L1 cache memory with data of the store operation request for the memory space unit after the requestor is notified by the missing store operation accelerator cache;
            requesting a copy of data located at the exclusively-owned memory space unit from a memory space;
            retrieving the data from the memory space; and
            updating the installed entry with the copy of the data modified by the store operation request data of the store operation request;
        sending a positive acknowledgement from the L1 cache memory to the requestor; and
    wherein the indicated exclusively-owned memory space units are indicated as such when there is not a copy of data of the requested by the store operation in the L1 cache memory.

9. The apparatus of claim 8, wherein the missing store operation accelerator is operable to install indication of an exclusively owned memory space unit incident to one of eviction of the exclusively owned memory space unit from the cache memory and indication in the cache memory of exclusively owned coherence state for the exclusively owned memory space unit.

10. The apparatus of claim 8, wherein the missing store operation accelerator is further operable to evict an indication of an exclusively owned memory space unit incident to a snoop hit on the exclusively owned memory space unit in the missing store operation accelerator.

11. The apparatus of claim 8 further comprising:
    a second cache memory coupled with the processing unit and the missing store operation accelerator, the second cache memory operable to represent memory space units and to indicate coherency state of the memory space units;

the missing store operation accelerator further operable to indicate whether the cache memory, the second cache memory, or the missing store operation accelerator possesses exclusive ownership of an indicated memory unit.

12. The apparatus of claim 11, wherein the missing store operation accelerator is further operable to snoop the second cache memory if a store operation misses in the cache memory and hits in the missing store operation accelerator, and if the missing store operation accelerator owns a target of the store operation.

13. The apparatus of claim 11 further comprising a data path between the cache memory and the second cache memory through the missing store operation accelerator.

14. The apparatus of claim 8, wherein the missing store operation accelerator comprises one of an on-chip cache and an off-chip cache.

15. The apparatus of claim 14, wherein the cache memory and the missing store operation accelerator cache memory are banked.

16. The apparatus of claim 15, wherein the missing store operation accelerator has fewer banks than the cache memory.

17. The apparatus of claim 8 further comprising a predictor operable to influence replacement of memory space unit indications in the missing store operation accelerator.

* * * * *